United States Patent
Person et al.

(10) Patent No.: US 11,898,598 B2
(45) Date of Patent: Feb. 13, 2024

(54) JOINT AND METHOD FOR PRODUCING A JOINT OF THIS TYPE

(71) Applicant: ZF Friedrichshafen AG, Friedrichshafen (DE)

(72) Inventors: Friederike Person, Rahden (DE); Michael Hahn, Osnabrück (DE); Linda Tönsing, Uchte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 158 days.

(21) Appl. No.: 17/265,349

(22) PCT Filed: Jul. 10, 2019

(86) PCT No.: PCT/EP2019/068468
§ 371 (c)(1),
(2) Date: Feb. 2, 2021

(87) PCT Pub. No.: WO2020/035226
PCT Pub. Date: Feb. 20, 2020

(65) Prior Publication Data
US 2021/0301864 A1 Sep. 30, 2021

(30) Foreign Application Priority Data
Aug. 13, 2018 (DE) ...................... 10 2018 213 606.8

(51) Int. Cl.
F16C 11/06 (2006.01)

(52) U.S. Cl.
CPC ...... *F16C 11/0614* (2013.01); *F16C 11/0638* (2013.01); *F16C 11/0671* (2013.01); *F16C 11/0685* (2013.01); *F16C 2220/04* (2013.01)

(58) Field of Classification Search
CPC .............. F16C 11/0614; F16C 11/0666; F16C 11/0671; F16C 11/0685; F16C 2220/04;
(Continued)

(56) References Cited

U.S. PATENT DOCUMENTS 3,378,287 A * 4/1968 Ulderup .................... B62D 7/16
384/138
3,472,540 A * 10/1969 Gottschald ............. B60G 7/005
277/504
(Continued)

FOREIGN PATENT DOCUMENTS

DE 44 20 487 C1 6/1995
DE 10207779 C1 * 10/2003 ............. B60G 7/005
(Continued)

OTHER PUBLICATIONS

"Everything You Need to Know About Overmolding Prototypes." Rogers, Tony. Creative Mechanisms, Aug. 26, 2015, [online], [ retrieved on Sep. 27, 2022] Retrieved from the Internet <URL:https://www.creativemechanisms.com/blog/overmolding-prototype-design-development>. (Year: 2015).*

(Continued)

*Primary Examiner* — Josh Skroupa
*Assistant Examiner* — Kevin J Baynes
(74) *Attorney, Agent, or Firm* — Finch & Maloney PLLC (57) ABSTRACT

A joint has a housing with journal openings, an inner joint portion with a bearing area, which is fitted into the housing and extends axially out of the housing through the openings. A bearing body is arranged in and firmly connected to the housing which encloses the bearing body and comprises plastic. The inner joint portion is fitted and able to move within the body. Sealing bellows surround the inner joint portion and extend from a bearing-body-side bellows contact area, provided on the body or the housing, to an inner-joint-portion-side bellows contact area, provided on the inner joint portion. A sleeve is provided, on at least one of the bellows contact areas, that surrounds the inner joint portion and extends axially. The sleeve surrounds the bellows or is surrounded by the bellows, and has, at an axial (Continued)

end, a radial limb against which the bellows is axially supported.

16 Claims, 2 Drawing Sheets

(58) Field of Classification Search
CPC .............. F16C 11/0676; F16C 11/0628; F16C 11/0633; F16C 11/0638; F16J 3/042; Y10T 403/31; Y10T 403/315; Y10T 403/32729
See application file for complete search history.

(56) References Cited

U.S. PATENT DOCUMENTS

| | | | | |
|---|---|---|---|---|
| 4,034,996 A * | 7/1977 | Manita | ................... | B60G 5/053 403/228 |
| 4,109,976 A * | 8/1978 | Koch | ................... | F16C 11/0671 277/504 |
| 4,386,869 A * | 6/1983 | Smith | ................. | F16C 11/0671 403/136 |
| 4,447,094 A * | 5/1984 | Trudeau | ............... | F16C 11/0666 403/39 |
| 5,066,159 A * | 11/1991 | Urbach | ............... | F16C 11/0671 403/135 |
| 5,242,228 A * | 9/1993 | Hattori | ................ | F16C 11/0614 384/153 |
| 5,480,231 A * | 1/1996 | Sasaki | ................... | F16C 33/201 384/298 |
| 5,489,161 A * | 2/1996 | Sugita | ................ | F16C 11/0633 403/119 |
| 5,601,378 A * | 2/1997 | Fukukawa | .......... | F16C 11/0638 403/135 |
| 5,611,635 A * | 3/1997 | Schutt | ................ | F16C 11/0642 403/135 |
| 5,782,573 A * | 7/1998 | Dorr | ..................... | F16C 11/069 403/135 |
| 5,931,597 A * | 8/1999 | Urbach | ................. | B60G 7/005 403/132 |
| 6,109,816 A * | 8/2000 | Iwasaki | ............... | F16C 11/0657 403/135 |
| 6,254,114 B1 * | 7/2001 | Pulling | ................... | F16C 7/026 403/135 |
| 6,530,711 B2 * | 3/2003 | Menotti | .............. | F16C 11/0671 403/135 |
| 6,685,377 B2 * | 2/2004 | Nakata | ................ | F16C 11/0671 403/135 |
| 6,736,565 B2 * | 5/2004 | Tamatsu | .............. | F16C 11/0638 29/898.047 |
| 6,866,441 B2 * | 3/2005 | Yokoyama | ............... | F16J 3/042 403/135 |
| 6,913,409 B2 * | 7/2005 | Abels | ....................... | B62D 7/16 403/50 |
| 6,962,351 B2 * | 11/2005 | De Freitas | .......... | F16C 11/0671 277/637 |
| 7,438,493 B2 * | 10/2008 | Holmes | ............... | F16C 11/0671 403/50 |
| 8,895,604 B2 * | 11/2014 | Gruss | ..................... | A61P 29/00 514/410 |
| 8,985,604 B2 * | 3/2015 | Hopson | ................. | F16C 27/063 280/124.134 |
| 9,181,975 B2 * | 11/2015 | Rechtien | ................ | F16C 43/02 |
| 9,562,567 B2 * | 2/2017 | Voisine | ................... | F16C 33/74 |
| 10,544,825 B2 * | 1/2020 | Parker | ................. | F16C 11/0628 |
| 10,711,829 B2 | 7/2020 | Sieve et al. | | |
| 2006/0140711 A1 * | 6/2006 | Morales Arnaez | ... | F16C 11/069 403/122 |
| 2007/0116511 A1 * | 5/2007 | Schlar | ..................... | F16C 35/02 403/122 |
| 2009/0060633 A1 * | 3/2009 | Broker | ................ | F16C 11/0614 403/2 |
| 2015/0226256 A1 | 8/2015 | Voisine | | |

FOREIGN PATENT DOCUMENTS

| | | | | |
|---|---|---|---|---|
| DE | 10 2008 005 295 | A1 | 7/2009 | |
| DE | 102008005295 | A1 * | 7/2009 | ......... F16C 11/0671 |
| DE | 10 2016 220 438 | A1 | 4/2018 | |
| EP | 1035337 | A2 * | 9/2000 | ............... B62D 7/16 |
| JP | 06323354 | A * | 11/1994 | ............. B60G 7/005 |

OTHER PUBLICATIONS

German Office Action Corresponding to 10 2018 213 606.8 dated Apr. 14, 2020.
International Search Report Corresponding to PCT/EP2019/068468 dated Nov. 8, 2019.
Written Opinion Corresponding to PCT/EP2019/068468 dated Nov. 8, 2019.

* cited by examiner

JOINT AND METHOD FOR PRODUCING A JOINT OF THIS TYPE

This application is a National Stage completion of PCT/EP2019/068468 filed Jul. 10, 2019, which claims priority from German patent application serial no. 10 2018 213 606.8 filed Aug. 13, 2018.

FIELD OF THE INVENTION

The invention relates to a joint with a housing having at least one journal opening, an inner joint portion having a bearing area which with its bearing area is arranged inside the housing and which extends in an axial direction out of the housing through the journal opening, a bearing body arranged in the housing, which is connected solidly thereto, is made of plastic, and surrounds the bearing area, in which bearing body the inner joint portion with its bearing area is fitted and able to move, and at least one sealing bellows that surrounds the inner joint portion and which extends from a bellows contact area provided, on the bearing body side, on the bearing body or the housing, to a bellows contact area provided, on the inner joint portion side, on the inner joint portion. In addition the invention relates to a method for producing a joint of that type.

BACKGROUND OF THE INVENTION

In the prior art, the sealing bellows is for example applied directly against the inner joint portion. Furthermore, the sealing bellows is attached to the housing or to the bearing body, for example often over a radial ridge and in a bellows holding groove. For that purpose, during assembly the sealing bellows has to be expanded or compressed in order to be able to fit over the radial ridge, and this makes the fitting of the sealing bellows more difficult. The same can also apply to the bellows contact area provided on the inner joint portion. Moreover, additional elements and/or working steps are often needed in order to secure the sealing bellows on the bellows contact areas. For example, once the sealing bellows has been fitted an additional clamping ring is fixed on each of its ends. For example, particularly in the case of the bellows contact area provided on the housing, an additional ring element is arranged between the bearing body and the sealing bellows, which is held fast by folding over a housing rim between the housing and the ring element, and by means of which the bearing body is secured in the housing.

SUMMARY OF THE INVENTION

Starting from there, the particular purpose of the invention is to simplify the securing of the sealing bellows on at least one or on both of the bellows contact areas and/or to enable it to be carried out less expensively.

This objective is achieved by a joint and/or by a method according to the independent claim(s). Preferred further developments of the joint and/or the method emerge from the subordinate claims and from the description given below.

The joint mentioned at the beginning, with a housing that has at least one journal opening, an inner joint portion comprising a bearing area, which with its bearing area is arranged in the housing and which extends in an axial direction out of the housing through the journal opening, a bearing body arranged in the housing, which is connected solidly thereto, is made of plastic, and surrounds the bearing area, in which bearing body the inner joint portion with its bearing area is fitted and able to move, and at least one sealing bellows that surrounds the inner joint portion and which extends from a bellows contact area provided, on the bearing body side, on the bearing body or the housing, to a bellows contact area provided, on the inner joint portion side, on the inner joint portion, is in particular further developed in that on at least one of the bellows contact areas a sleeve made of plastic that surrounds the inner joint portion and extends in the axial direction is provided, which sleeve surrounds the sealing bellows or is surrounded by it and at an axial end has a radial limb on which the sealing bellows, particularly at the front and/or at the end, is axially supported.

Since the sleeve, or the at least one sleeve comprises plastic, it can be ensured that there is little friction between the sealing bellows and the sleeve. Moreover it is possible to make the sleeve or at least one sleeve in particular as a cylindrical plastic sleeve, particularly to begin with, and to provide it on the at least one bellows contact area, after which when the sealing bellows is guided over the inner joint portion the sealing bellows and the sleeve are pushed one into the another, after which the sleeve, particularly at its axial end, is provided with the radial limb that supports the sealing bellows axially, in particular at the front and/or end. Thus, the sealing bellows does not have to be expanded or compressed for assembly, since the sleeve, in particular initially, is manufactured as a cylindrical sleeve and is only provided with the radial limb after the sealing bellows has been assembled.

Preferably, on each bellows contact area a plastic sleeve that surrounds the inner joint portion and extends in the axial direction is provided, which surrounds the sealing bellows or is surrounded by it and has at one axial end a radial limb against which the sealing bellows is axially supported, in particular at the front and/or at the end. In that way the aforesaid advantages can be realized on each bellows contact area.

Associated with the joint and/or the housing and/or the bearing body there is preferably a longitudinal axis. In particular, the longitudinal axis extends through the middle of the housing. Preferably, the longitudinal axis extends centrally through the, or, the at least one journal opening. Advantageously, the longitudinal axis extends centrally through the bearing body. Preferably, the longitudinal axis extends in the, or in an axial direction. A direction, or any direction that extends transversely to the axial direction and/or the longitudinal axis is specifically called a radial direction.

Preferably, the housing surrounds the inner joint portion and/or the bearing body. Advantageously, the housing comprises a wall that surrounds the inner joint portion and/or the bearing body. Advantageously, relative to the longitudinal axis, the housing is formed rotationally symmetrically, or approximately rotationally symmetrically. Preferably, the housing is attached to the bearing body firmly and/or solidly and/or with interlock. In particular, at least at one or at each of its ends or end areas the housing has one, or at least one projection which extends radially into the material or the plastic of the bearing body, by means of which projection the bearing body is secured on or in the housing with interlock, particularly in the axial direction. Preferably, particularly relative to the longitudinal axis, the housing is connected with the bearing body in a rotationally fixed manner. Advantageously, particularly in the wall or in one of the walls that surround the bearing body, the housing has a plurality of impressions a distance apart from one another in the circumferential direction of the housing, which extend radially into the material or plastic of the bearing body and/or in recesses provided in them and a distance away from one another. Preferably, by virtue of the impressions and in particular relative to the longitudinal axis, the bearing body is attached to the housing in a rotationally fixed manner. Preferably, particularly in the axial direction, the bearing body is secured with interlock on or in the housing. Advantageously, in the axial direction the impressions are provided in particular centrally between the projections. The housing preferably forms a body of stable shape. In particular, the housing is made of metal. For example, the housing is made of aluminum or a ferrous material such as steel. Preferably, the housing consists of sheet metal, for example aluminum sheet or steel sheet.

The inner joint portion is preferably associated with an inner-joint-portion longitudinal axis, which preferably extends through the middle of the inner joint portion. Advantageously, relative to the axis of the inner joint portion, the inner joint portion is made rotationally symmetrical or approximately rotationally symmetrical. For example, especially in a neutral direction of the inner joint portion the longitudinal axis of the inner joint portion extends in the axial direction or approximately in the axial direction. Preferably, due to the movable fitting of the bearing area in the bearing body, the inner joint portion can be rotated or pivoted relative to the housing. Thus for example, the longitudinal axis of the inner joint portion can be inclined relative to the axial direction and/or relative to the longitudinal axis. In the or in a neutral position of the inner joint portion, the longitudinal axis of the inner joint portion coincides in particular with the longitudinal axis and/or, in the or in a neutral position of the inner joint portion, the longitudinal axis of the inner joint portion extends in particular in the axial direction. The inner joint portion consists for example of solid material and/or the inner joint portion is for example provided with a through-going hole that preferably extends in the direction of the longitudinal axis of the inner joint portion. The bearing area of the inner joint portion is for example of spherical and/or convex and/or spherical shape. For example, the inner joint portion comprises one or at least one neck area connected to the bearing area and extending away therefrom, which can for example also be called the journal area. Advantageously, the inner joint portion has two neck areas connected to the bearing area and extending away therefrom, between which the bearing area is arranged. Preferably, the inner joint portion forms a ball stud or ball sleeve. Advantageously, the joint is a ball joint or a ball sleeve joint. The inner joint portion preferably forms a body of stable shape. In particular, the inner joint portion is made of metal. For example, the inner joint portion is made of aluminum or a ferrous material such as steel.

The bellows contact area on the inner joint portion side is in particular outside the housing and/or the bearing body. Advantageously, the bellows contact area on the inner joint portion side is provided on the, or on the at least one neck area or one of the neck areas. Preferably, on its outer circumference, in particular in or on the bellows contact area on the inner joint portion side and/or at its preferably axial ends, the inner joint portion is provided with a reduced diameter and/or with a preferably circumferential recess which, in particular, forms a sleeve seating. The sleeve, or the at least one sleeve or one of the sleeves is seated in or on the sleeve seating.

The bearing body preferably surrounds the inner joint portion. Preferably, the bearing body has a wall that surrounds the inner joint portion. Preferably, relative to the longitudinal axis the bearing body is made rotationally symmetrical, or approximately rotationally symmetrical. In particular, the inner joint portion with its bearing area is fitted into the bearing body so that it can slide and/or rotate and/or pivot. Preferably, the bearing body is a body of stable shape. In particular, the bearing body is made from a thermoplastic plastic. For example, the bearing body is made from polyamide (PA) or polyoxymethylene (POM). Advantageously, the plastic of the bearing body is mixed with and/or reinforced with fibers. For example, the fibers are glass fibers.

The sleeve, or the at least one sleeve, or each sleeve preferably forms a body of stable shape. In particular, the sleeve, or the at least one sleeve or each sleeve consists of a thermoplastic plastic. For example, the sleeve or the at least one sleeve or each sleeve consists of polyamide (PA) or polyoxymethylene (POM). Advantageously, the plastic of the sleeve, or the at least one sleeve or each sleeve is mixed with and/or reinforced by fibers. For example, the fibers are glass fibers. Preferably, the sleeve, or the at least one sleeve or each sleeve is made from the same or the identical plastic as the bearing body.

The radial limb of the sleeve, or the at least one sleeve or each sleeve is in particular ring-shaped. Preferably, the sleeve, or the at least one sleeve or each sleeve has an axial limb. Preferably, the axial limb of the sleeve, or the at least one sleeve or each sleeve merges into the radial limb of the sleeve, or the at least one sleeve or each sleeve. The axial limb of the sleeve, or the at least one sleeve or each sleeve is in particular cylindrical.

The sealing bellows, or the at least one sealing bellows, is preferably elastic. Preferably the, or the at least one sealing bellows consists of an elastic body. Preferably the, or the at least one sealing bellows is rotationally symmetrical or approximately rotationally symmetrical relative to the longitudinal axis, particularly in the, or in a neutral position of the inner joint portion. Preferably the sealing bellows, or the at least one sealing bellows consists of an elastomer. For example the sealing bellows is made from chloroprene rubber (CR). Preferably, in at least one or in each preferably axial end area of the, or the at least one sealing bellows, a reinforcing ring is imbedded, which ring is preferably made of metal.

Preferably, the sealing bellows is in contact with the sleeve or at least one sleeve or each sleeve, preferably at the end or ends thereof, in particular radially and/or axially. Advantageously, the sealing bellows is in sliding contact with the sleeve or at least one sleeve or each sleeve. Preferably, the sealing bellows is in contact with the sleeve or at least one sleeve or each sleeve on its/their radial limb, preferably at the end and/or the front thereof, in particular axially. Advantageously, the sealing bellows is in sliding contact with the radial limb of the sleeve or at least one sleeve or each sleeve. Preferably, the sealing bellows is in contact with the axial limb of the sleeve or at least one sleeve or each sleeve, preferably at the end and in particular radially. Advantageously, the sealing bellows is in sliding contact with the axial limb of the sleeve or at least one sleeve or each sleeve.

In one embodiment, the sleeve, or the at least one sleeve or one sleeve or at least one of the sleeves or another or at least another one of the sleeves constitute(s) a sleeve or at least one sleeve on the inside of the inner joint portion, which is/are attached preferably firmly and/or by friction force and/or in a material-merged manner to the inner joint portion. For example, the sleeve on the inner joint portion side is injection-molded onto the inner joint portion or pushed and/or pressed onto it. Preferably, the sealing bellows surrounds the sleeve on the inner-joint-portion side. Preferably, the outer diameter of the sleeve on the inner-joint-portion side is smaller than or equal to the inside diameter of the end area of the sealing bellows which is remote from the bearing body and surrounds the sleeve on the inner-joint-portion side. Advantageously, the radial limb of the sleeve on the inner-joint-portion side extends, preferably starting from the sleeve on the inner-joint-portion side, away from the inner joint portion.

The bellows contact area on the bearing body side is provided, for example, on the housing. In this case, the bellows contact area on the bearing body side can for example also be called the bellows contact area on the housing side. Preferably, the bellows contact area on the bearing body side is provided on the bearing body.

According to a further development, the sleeve, or the at least one sleeve or one sleeve or at least one of the sleeves or another or at least one other of the sleeves constitutes a sleeve or at least one sleeve on the bearing body side, which is preferably attached firmly and/or in a material-merged manner to the bearing body and/or is made integrally and/or in a material-homogeneous manner with the bearing body. For example, the sleeve on the bearing body side is injection-molded onto the bearing body and/or together with it forms an injection-molded component. Preferably, the sealing bellows is surrounded by the sleeve on the bearing body side. Preferably, the inside diameter of the sleeve on the bearing body side is larger than or equal to the outer diameter of the end area of the sealing bellows that faces toward the bearing body and is surrounded by the sleeve on the bearing body side. Advantageously, the radial limb of the sleeve on the bearing body side extends, preferably starting from the sleeve on the bearing body side, to and onto the inner joint portion.

According to one embodiment, the housing is provided with two journal openings preferably opposite one another in the axial direction. Preferably, in that case the inner joint portion extends, particularly in the axial direction, through the two journal openings and out of the housing. Advantageously, the joint has two sealing bellows that surround the inner joint portion, each of them extending from a bearing-body-side bellows contact area provided on the bearing body or the housing, to an inner-joint-portion-side bellows contact area provided on the inner joint portion. Here, the bearing-body-side bellows contact areas are preferably provided on two ends of the housing or the bearing body axially opposite one another. Preferably, the inner-joint-portion-side bellows contact areas are provided on different sides of the inner joint portion in the axial direction relative to the bearing area. In particular, the inner-joint-portion-side bellows contact areas are outside the housing and/or the bearing body. Advantageously, the inner-joint-portion-side bellows contact areas are provided on the neck areas.

The joint is or will preferably be provided for a vehicle and/or fitted in the vehicle. The vehicle is in particular a motor vehicle. Advantageously, the inner joint portion is or will be connected to a first vehicle component, which is preferably a chassis component. For example, the first vehicle component is an axle journal, a wheel carrier, a chassis control arm such as a transverse or longitudinal control arm, an axle body, a sub-frame, an auxiliary frame or a vehicle body or vehicle frame. Advantageously, the housing is or will be connected to a second vehicle component, which is preferably a chassis component. For example, the second vehicle component is an axle journal, a wheel carrier, a chassis control arm such as a transverse or longitudinal control arm, an axle body, a sub-frame, an auxiliary frame or a vehicle body or vehicle frame.

The invention also preferably relates, in particular, to a method for producing the, or a joint as described above, wherein the inner joint portion, the housing and the at least one sealing bellows are made, or an inner joint portion comprising a bearing area, a housing provided with at least one journal opening, and at least one sealing bellows are made, the inner joint portion is fitted into the housing so that it is arranged with the bearing area in the housing and extends out of it through the journal opening, particularly in the, or in an axial direction, by injection molding or casting plastic around the bearing area arranged in the housing, the bearing body, or a bearing body that preferably encloses the bearing area and accommodates it in a movable manner is made and is attached firmly to the housing, the at least one sealing bellows is guided over the inner joint portion so that the sealing bellows surrounds the inner joint portion and extends from the bearing-body-side bellows contact area, or from a bearing-body-side bellows contact area preferably provided on the bearing body or the housing, to the inner-joint-portion-side bellows contact area, or an inner-joint-portion-side bellows contact area preferably provided on the inner joint portion, the sleeve, or at least one, or one sleeve or at least one sleeve, in particular made first as a cylindrical plastic sleeve, is provided on the at least one bellows contact area or on at least one of the bellows contact areas, so that the sleeve surrounds the inner joint portion and extends in the axial direction, after which, when the sealing bellows is guided over the inner joint portion, the sealing bellows and the sleeve are pushed one into the other, after which the sleeve, preferably by deformation and/or bending, is provided, in particular axially at the end, with the limb, or its limb, or a limb that supports the sealing bellows axially, in particular at the front and/or at the end.

The method can be developed further in accordance with all the design features described earlier in connection with the joint. Furthermore, the joint described earlier can be developed further in accordance with all the features explained in connection with the method.

Since the sleeve, or the at least one sleeve is made of plastic, it can be ensured that little friction takes place between the sealing bellows and the sleeve. Moreover, to fit the sealing bellows it does not have to be expanded or compressed, since the sleeve is, particularly to begin with, made as a cylindrical sleeve and is only provided with the radial limb after the sealing bellows has been fitted.

Preferably, the sleeve or several sleeves are made, particularly to begin with, as cylindrical plastic sleeves and are provided on the bellows contact areas so that the sleeves surround the inner joint portion and extend in the axial direction, after which, when the sealing bellows has been fitted over the inner joint portion, the sealing bellows and each sleeve are pushed one into the other, after which each sleeve, preferably by deformation and/or bending, is provided, in particular axially at the end, with the limb, or its limb, or a limb that supports the sealing bellows axially, in particular at the front and/or at the end.

The housing is preferably produced by sheet forming and/or deformation. Advantageously the housing is made from metal, for example aluminum or a ferrous material such as steel. Preferably, the housing is made of sheet metal, in particular aluminum sheet or steel sheet.

The inner joint portion is preferably produced by cold-forming. Advantageously, particularly after cold-forming, the inner joint portion is finish-machined in or on its bearing area and/or on the surface of its bearing area. The finish machining includes for example cutting and/or roller burnishing and/or grinding. In particular the finish machining serves to smooth and/or harden the bearing area and/or the surface of the bearing area. The inner joint portion is preferably made of metal, for example aluminum or a ferrous material such as steel.

For example, the inner joint portion is made as a fully extruded inner joint portion and/or as a fully extruded ball sleeve. Advantageously the, or the at least one neck area and/or the neck areas and/or the inner-joint-portion-side bellows contact area, or the at least one inner-joint-portion-side bellows contact area or inner-joint-portion-side bellows contact areas, after the cold forming and before the fitting of the sleeve or the at least one sleeve or the sleeves on the, or on the at least one inner-joint-portion-side bellows contact area or inner-joint-portion-side bellows contact areas, are not after-treated and/or are left in the condition of the unfinished part.

The bearing body is preferably produced by casting or injection molding. In particular, the bearing body is produced from a thermoplastic material. For example, the bearing body is made from polyamide (PA) or polyoxymethylene (POM). Advantageously, the plastic of the bearing body is or will be mixed with and/or reinforced by fibers. Advantageously, the bearing body is made from a fiber-reinforced plastic. For example, the fibers are glass fibers. By injecting or casting around the bearing area in the housing with a plastic and/or by virtue of the production of the bearing body, the bearing area is preferably enclosed by the bearing body and/or the inner joint portion with its bearing area is fitted and can move in the bearing body.

The sleeve, or the at least one sleeve or each sleeve is preferably made by casting or injection molding. In particular the sleeve, or the at least one sleeve or each sleeve is made from a thermoplastic material. For example the sleeve, or the at least one sleeve or each sleeve is made from polyamide (PA) or polyoxymethylene (POM). Advantageously, the plastic of the sleeve, or the at least one sleeve or each sleeve is or will be mixed with and/or reinforced by fibers. For example, the fibers are glass fibers. Advantageously the sleeve, or the at least one sleeve or each sleeve is made from the same or the identical plastic or material as the bearing body. In particular, the radial limb of the sleeve, or the at least one sleeve or each sleeve is ring-shaped.

The sleeve, or the at least one sleeve or each sleeve, particularly at the axial end, is preferably provided with an axially supporting radial limb by which the, or one of the sealing bellows is supported, in particular axially at the front and/or at the end, in that, preferably axially at the end and/or on or in an axial end section, which in particular projects axially beyond an end area of the sealing bellows that faces toward it, the sleeve is bent and/or deformed. This bending and/or deformation preferably takes place by means of or by the use of a plastic deformation process. For example the bending and/or deformation takes place by means of or by the use of ultrasonic deformation and/or by means of or by the use of a thermal process. Alternatively the sleeve, or the at least one sleeve or each sleeve is provided, for example by welding, in particular axially at the end, with the or with a radial limb that supports the sealing bellows axially, particularly at the front and/or at the end, for example by welding the sleeve or the at least one sleeve or each sleeve to the radial limb, or to a radial limb.

Preferably the sleeve, or the at least one sleeve or each sleeve is provided and/or made with an axial limb. Preferably, the axial limb of the sleeve, or the at least one sleeve or each sleeve merges into the radial limb, or its or the respective radial limb. The axial limb of the sleeve, or the at least one sleeve or each sleeve is or will be in particular of cylindrical form.

The, or the at least one sealing bellows is preferably made from an elastic material and/or an elastomer. For example, the sealing bellows is made from chloroprene rubber (CR). Preferably, in at least one axial end area or at each, preferably axial end area of the sealing bellows, or the at least one sealing bellows, a reinforcing ring is embedded, which preferably consists and/or is made of metal. Preferably, when it is guided over the inner joint portion and/or when the sealing bellows and the sleeve, or the at least one sleeve or each sleeve are pushed one into the other, preferably at the end, the or the at least one sealing bellows is in particular fitted radially over the sleeve, or the at least one sleeve or each sleeve. Preferably, by virtue of the deformation and/or bending of the sleeve, or the at least one sleeve or each sleeve, the radial limb is fitted on the, or the at least one sealing bellows, preferably at the end and/or front and in particular axially.

According to one embodiment the sleeve, or the at least one sleeve or one sleeve or at least one of the sleeves or another sleeve or at least another of the sleeves forms a sleeve or at least one sleeve on the inner joint portion side, which in particular is attached to the inner joint portion firmly and/or by friction force and/or in a material-merged manner. Advantageously the sleeve on the inner joint portion side, particularly to begin with, is made in such manner that its outer diameter is smaller than or equal to the inside diameter of the end area of the sealing bellows that faces away or is to face away from the bearing body.

Preferably, the sealing bellows and the sleeve on the inner joint portion side are pushed one inside the other in such away that the sealing bellows surrounds the sleeve on the inner joint portion side, after which, preferably, the sleeve on the inner joint portion side, particularly axially at the end or in an axial end section which preferably projects axially beyond the end area of the sealing bellows facing away from the bearing body, is deformed and/or bent and/or provided with the radial limb, or with a radial limb, preferably in such manner that its radial limb extends away from the inner joint portion, in particular starting from the sleeve on the inner joint portion side.

The sleeve on the inner joint portion side is for example made separately and then pushed and/or pressed onto the inner joint portion. Preferably, however, the sleeve on the inner joint portion side is injected onto the inner joint portion.

In one embodiment the sleeve, or the at least one sleeve or a sleeve or at least one of the sleeves or another sleeve or at least another of the sleeves, forms a bearing-body-side sleeve, or at least one bearing-body-side sleeve, which in particular is attached firmly and/or in a material-merged manner to the bearing body and/or is made integrally with it. Advantageously the sleeve on the bearing body side, particularly to begin with, is made in such manner that its inside diameter is larger than or equal to the outer diameter of the end area of the sealing bellows facing toward, or that is to face toward the bearing body.

Preferably, the sealing bellows and the sleeve on the bearing body side are pushed one into the other in such manner that the sealing bellows is or will be surrounded by the sleeve on the bearing body side, after which, preferably, the sleeve on the bearing body side, in particular axially at its end and/or on or in an axial end section, projects axially beyond an end area of the sealing bellows which preferably faces toward the bearing body, and is deformed and/or bent and/or provided with the radial limb, or with a radial limb, preferably in such manner that its radial limb extends in particular starting from the sleeve on the bearing body side toward the inner joint portion.

Preferably the bearing-body-side sleeve, or the at least one bearing-body-side sleeve, is made together with and/or at the same time as the bearing body, in particular by a casting or injection molding process. Advantageously the bearing-body-side sleeve, or the at least one bearing-body-side sleeve, is made together with and/or at the same time as the inner-joint-portion-side sleeve, or the at least one inner-joint-portion-side sleeve, in particular by the, or by a casting or injection-molding process.

According to one embodiment the housing, particularly during its production, is or will be provided with two journal openings which are preferably opposite one another in the axial direction. Preferably, the inner joint portion is fitted into the housing in such manner that it is or will be arranged in the housing with the bearing area inside the housing, and extends out of the housing through the journal opening, or the two journal openings, particularly in the axial direction. Advantageously, two sealing bellows are made. In particular each of the sealing bellows is guided over the inner joint portion so that each sealing bellows surrounds the inner joint portion and extends from the bearing-body-side bellows contact area, or from a bearing-body-side bellows contact area preferably provided on the bearing body, to the inner-joint-portion-side bellows contact area, or an inner-joint-portion-side bellows contact area preferably provided on the inner joint portion. In that case the bearing-body-side bellows contact areas are or will preferably be provided on two ends of the housing opposite one another in the axial direction. Preferably, the inner-joint-portion-side bellows contact areas are or will be provided on different sides of the inner joint portion in the axial direction relative to the bearing area. The inner-joint-portion-side bellows contact areas are in particular outside the housing and/or the bearing body. Advantageously, the inner-joint-portion-side bellows contact areas are provided on the neck areas.

BRIEF DESCRIPTION OF THE DRAWINGS

Below, the invention will be described below using a preferred embodiment with reference to the drawings. The drawings show.

DETAILED DESCRIPTION OF THE PREFERRED EMBODIMENTS

Figure 1:
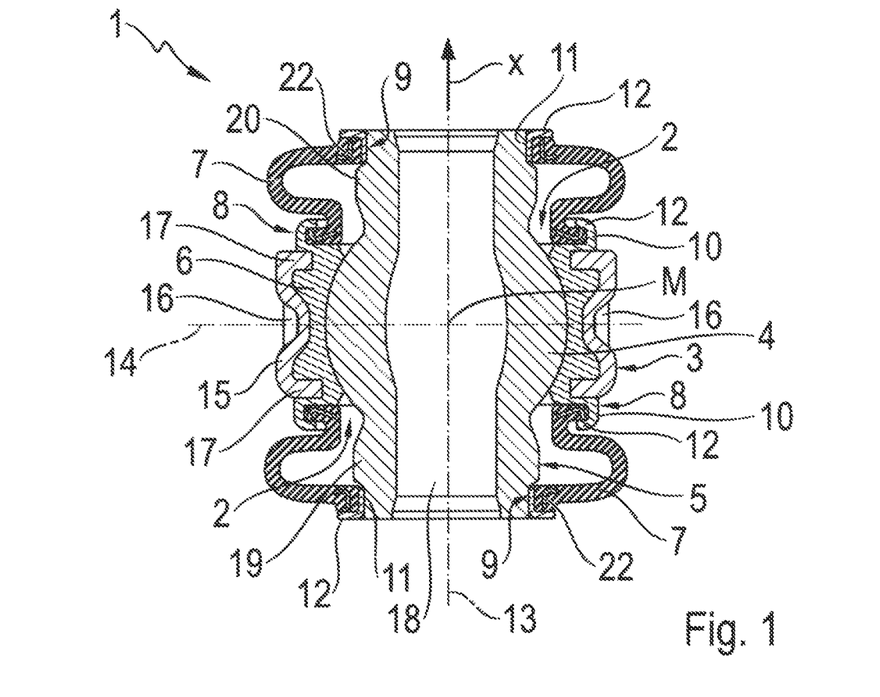
FIG. 1: A longitudinal section through the joint, according to an embodiment of the invention.

FIG. 1 shows a longitudinal section through a joint 1 in the form of a ball sleeve joint according to one embodiment, which comprises a housing 3 with two journal openings 2 opposite one another in an axial direction x, an inner joint portion 5 in the form of a ball sleeve that comprises a ball-shaped bearing area 4, which with its bearing area 4 is arranged in the housing 3 and which extends through the journal openings 2 out of the housing 3, a bearing body 6 which is arranged in the housing 3, is firmly attached to the housing 3, encloses the bearing area 4, and consists of plastic, in which bearing body 6 the inner joint portion 5 with its bearing area 4 is fitted so that it can move, and two sealing bellows 7 that surround the inner joint portion, each of which extends from a bearing-body-side bellows contact area 8 provided on the bearing body 6 to an inner-joint-portion-side bellows contact area 9 provided on the inner joint portion 5.

A sleeve 10 is provided on each of the bearing-body-side bellows contact areas 8 and is made of plastic, extends in the axial direction x and surrounds the inner joint portion 5, which surrounds the respective sealing bellows 7 and at its axial end has a radial limb 12 that extends toward the inner joint portion 5, against which limb the respective sealing bellows 7 is axially supported at its end. In addition, on each of the inner-joint-portion-side bellows contact areas 9 a sleeve 11 is provided, which is made of plastic, extends in the axial direction x and surrounds the inner joint portion 5, which sleeve is surrounded by the respective sealing bellows 7 and has at an axial end a radial limb 12 that extends away from the inner joint portion 5, against which the respective sealing bellows 7 is supported axially at its end.

Associated with the joint 1 and/or the housing 3 there is a longitudinal axis 13 that extends in the axial direction x, which in particular passes centrally through the housing 3 and/or through the journal openings 2. In particular, each or any direction transverse to the axial direction x and/or to the longitudinal axis 13 is called a radial direction. Relative to the longitudinal axis 13, the housing 3 is rotationally symmetrical or approximately rotationally symmetrical. Furthermore, associated with the inner joint portion 5 there is an inner joint portion longitudinal axis, which in the neutral position of the inner joint portion 5 shown in the figures of the drawing, coincides with the longitudinal axis 13. Relative to the longitudinal axis of the inner joint portion, the inner joint portion 5 is rotationally symmetrical. Moreover, particularly in the neutral position, relative to a plane of symmetry 14 that passes through the mid-point M of the bearing area 4 perpendicularly to the longitudinal axis 13, the joint 1 is made mirror-symmetrically, or approximately mirror-symmetrically.

The housing 1 has a wall 15 that surrounds the bearing body 6, in which a number of impressions 16 a distance apart from one another in the circumferential direction of the housing 3 are provided, which extend radially into the material of the bearing body 6 so that the bearing body is attached to the housing 3 in a rotationally fixed manner. Apart from these impressions 16, the housing 3 is in particular of rotationally symmetrical form. Furthermore, at its axial ends, the housing 3 has in each case a projection 17 that extends radially into the material of the bearing body 6, by which the bearing body 6 is secured with interlock to the housing 3 in the axial direction x.

Through the inner joint portion 5 there passes a through-going hole 18, which in particular extends in the axial direction x and/or in the direction of the longitudinal axis of the inner joint portion. In addition, the inner joint portion 5 has two neck areas 19 and 20 which are each connected with the bearing area 4 and extend away from it, between which the bearing area 4 is located. The inner-joint-portion-side bellows contact areas 9 are provided on the neck areas 19 and 20. In particular the inner-joint-portion-side bellows contact areas 9 are formed by preferably axial end sections of the inner joint portion 5. Preferably, in the inner-joint-portion-side bellows contact areas 9, the inner joint portion 5 is provided on its outer circumference with all-round recesses 21, which form sleeve seatings for the sleeves 11 on the inner joint portion sides. Furthermore, the sealing bellows 7 are in each case provided at their ends with embedded reinforcing rings 22.

Figure 2:
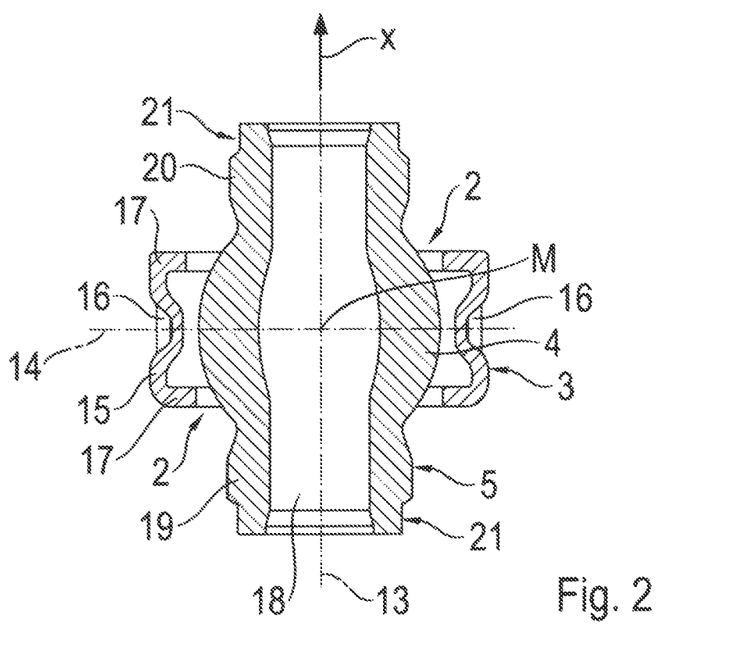
FIG. 2: A longitudinal section through the joint in the partially assembled condition, wherein an inner joint portion is fitted into a housing.
Figure 3:
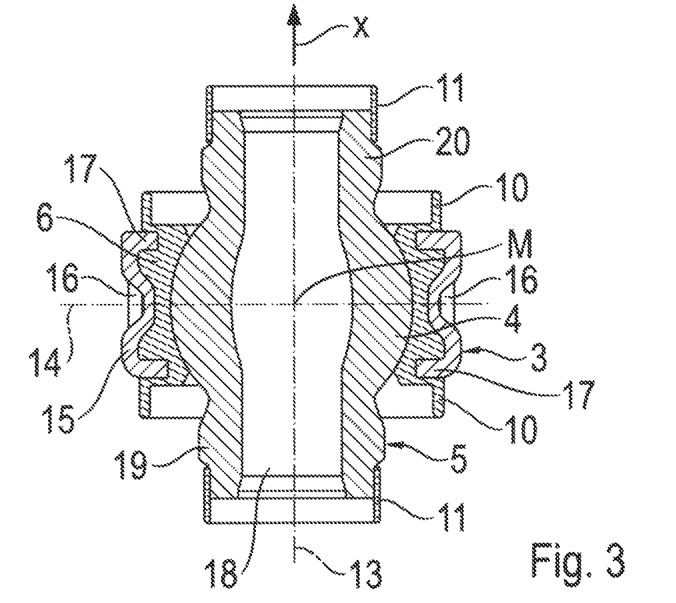
FIG. 3: The longitudinal section according to FIG. 2 wherein, in addition, a bearing body that encloses the inner joint portion is provided in the housing.

Below, with reference to FIGS. 2 and 3 a method for producing the joint 1 will be described.

First, the housing 3, the inner joint portion 5 and the sealing bellows 7 are produced. Then, the inner joint portion 5 is fitted into the housing 3 so that it is arranged with the bearing area 4 inside the housing 3 and extends out of the housing through the journal openings 2. This can be seen in FIG. 2. Thereafter, the bearing body 6 is made by injecting plastic around the bearing area 4 arranged in the housing 3, and at the same time the sleeves 10 and 11 are produced initially as cylindrical sleeves made of plastic, as can be seen in FIG. 3. During this the bearing-body-side sleeves 10 are made integrally with the bearing body 6. In addition, the inner-joint-portion-side sleeves 11 are injected into the all-round recesses 21 on the inner joint portion 5.

Figure 4:
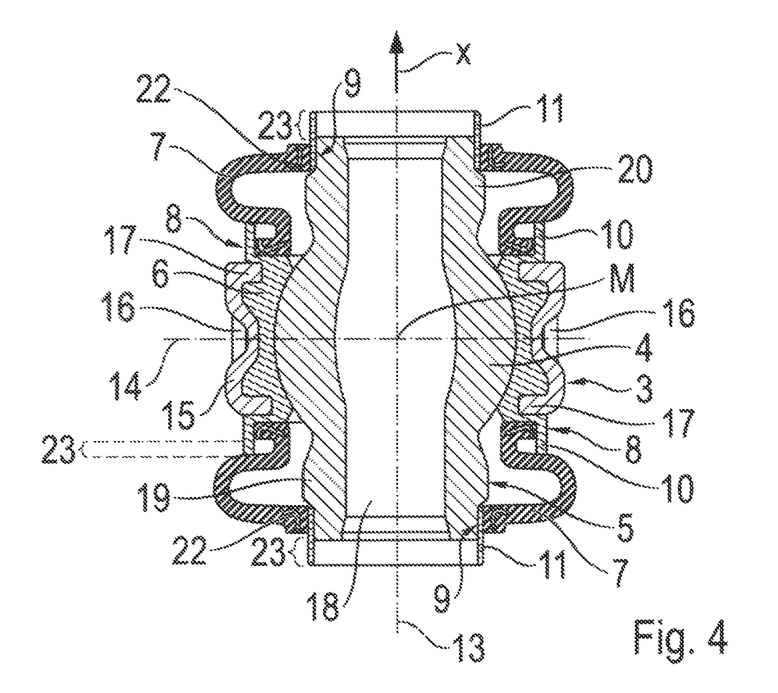
FIG. 4: The longitudinal section according to FIG. 3 wherein, in addition, two sealing bellows have been pushed onto the inner joint portion.

After that, the sealing bellows 7 are guided over the inner joint portion 5 from various axial sides, so that the sealing bellows 7 and the sleeves 10 and 11 are pushed one into the other. Thus, the sealing bellows 7 surround the inner-joint-portion-side sleeves 11, while in contrast, the sealing bellows 7 are surrounded by the bearing-body-side sleeves 10, as can be seen in FIG. 4.

Thereafter, by ultrasonic forming or using a thermal process the sleeves 10 and 11 are bent, whereby they are provided with the radial limbs 12 so that the joint 1 according to FIG. 1 is obtained.

INDEXES

1 Joint
2 Journal opening
3 Housing
4 Bearing area
5 Inner joint portion
6 Bearing body
7 Sealing bellows
8 Bellows contact area on the bearing body side
9 Bearing contact area on the inner joint portion side
10 Sleeve on the bearing body side
11 Sleeve on the inner joint portion side
12 Radial limb of the sleeves
13 Longitudinal axis
14 Plane of symmetry
15 Wall of the housing
16 Impression
17 Projection
18 Through-going hole
19 Neck area
20 Neck area
21 Recess
22 Reinforcing ring
23 Axial end section
x Axial direction
M Mid-point of the bearing area

The invention claimed is:

1. A joint comprising:
a housing provided with axially opposite journal openings,
an inner joint portion having an outer surface with a bearing area,
the inner joint portion with the bearing area being arranged in the housing and extending in an axial direction out of the housing through the journal openings,
a bearing body being arranged in and firmly attached to the housing and the bearing body having an inner surface that mates with the outer surface and encloses the bearing area, the bearing body extending axially completely through the housing and axially beyond the journal openings,
the bearing body comprising plastic and being materially uniform in a radial direction from the housing to the inner surface thereof,
the outer surface of the inner joint portion being movably supported on the inner surface of the bearing body such that the inner joint portion and the bearing area are movable relative to the bearing body and the housing,
at least one sealing bellows surrounding the inner joint portion and extending from a bearing-body-side bellows contact area provided on the bearing body to an inner-joint-portion-side bellows contact area provided on the inner joint portion,
at least one sleeve being provided on at least one of the bearing-body-side and the inner-joint-portion-side bellows contact areas and surrounding the inner joint portion, and
the at least one sleeve extending in the axial direction and being made of plastic, the at least one sleeve surrounding the at least one sealing bellows or being surrounded by the at least one sealing bellows, and the at least one sleeve having, at an axial end thereof, a radial limb against which the at least one sealing bellows is axially supported.

2. The joint according to claim 1, wherein an other sleeve of the at least one sleeve, is provided on the other of the bearing-body-side and the inner-joint-portion-side bellows contact areas, the sleeves surround the inner joint portion and extend in the axial direction, one of the sleeves surrounds the at least one sealing bellows such that one axial end of the at least one sealing bellows is received by the one sleeve radially from within the bearing body and the other of the sleeves is surrounded by the at least one sealing bellows and, wherein each sleeve has at their axial end, the radial limb against which the at least one sealing bellows is axially supported.

3. The joint according to claim 1, wherein the at least one sleeve, is located on the inner-joint-portion side bellows contact area, and is firmly attached to the inner joint portion.

4. The joint according to claim 3, wherein the at least one sealing bellows surrounds the at least one sleeve located on the inner-joint-portion-side bellows contact area, and the radial limb extends away from the inner joint portion.

5. The joint according to claim 1, wherein the at least one sleeve is located on the bearing-body-side bellows contact area and is firmly attached to the bearing body or made integrally with the bearing body.

6. The joint according to claim 5, wherein the at least one sealing bellows is surrounded by the at least one sleeve located on the bearing-body-side bellows contact area, and the radial limb extends toward the inner joint portion such that the bearing-body-side bellows contact area is located on a radial interior of the radial limb.

7. A method of producing a joint according to claim 1, and the method comprising:
   making the inner joint portion, the housing and the at least one sealing bellows,
   fitting the inner joint portion into the housing so that, via the bearing area, the inner joint portion is arranged in the housing and extends out of the housing in the axial direction through the journal openings,
   making the bearing body by injecting or casting plastic around the bearing area arranged in the housing, and firmly attaching the bearing body to the housing,
   guiding the at least one sealing bellows over the inner joint portion so that the at least one sealing bellows surrounds the inner joint portion and extends from the bearing-body-side bellows contact area to the inner-joint-portion-side bellows contact area, and
   forming the at least one sleeve as a cylindrical plastic sleeve and fitting the at least one sleeve over the at least one of the bearing-body-side and the inner-joint-portion-side bellows contact areas, so that the at least one sleeve surrounds the inner joint portion and extends in the axial direction, after which, when the at least one sealing bellows is guided over the inner joint portion, the at least one sealing bellows and the at least one sleeve are pushed into one another, after which the at least one sleeve that is provided with the radial limb supports the at least one sealing bellows axially.

8. The method according to claim 7, wherein the at least one sleeve comprises two sleeves, each made as cylindrical plastic sleeves and one of the sleeves is provided on the inner-joint-portion side bellows contact area, the other provided on the bearing-body-side bellows contact area, so that the two sleeves surround the inner joint portion and extend in the axial direction, after which, when the at least one sealing bellows is guided over the inner joint portion, the at least one sealing bellows is pushed into the two sleeves, after which each of the sleeves which are provided with the radial limb, axially supports the at least one sealing bellows.

9. The method according to claim 7, wherein the at least one sleeve is located on the inner-joint-portion side bellows contact area, and is firmly attached to the inner joint portion.

10. The method according to claim 9, wherein the at least one sealing bellows and the at least one sleeve on the inner joint portion side bellows contact area are pushed into one another in such a manner that the at least one sealing bellows surrounds the at least one sleeve, after which the at least one sleeve is bent, in such a manner, that the radial limb extends away from the inner joint portion.

11. The method according to claim 9, wherein the at least one sleeve is injection molded onto the inner-joint-portion-side bellows contact area of the inner joint portion.

12. The method according to claim 7, wherein the at least one sleeve is located on the bearing-body-side bellows contact area, and is firmly attached to the bearing body or made integrally with the bearing body.

13. The method according to claim 12, further comprising pushing the at least one sealing bellows and the at least one sleeve located on the bearing-body-side bellows contact area into one another such that the at least one sealing bellows is radially surrounded by the at least one sleeve, after which the at least one sleeve is bent such that the radial limb extends toward the inner joint portion and the at least one sealing bellows axially abuts the radial limb.

14. The method according to claim 12, further comprising making the at least one sleeve together with the bearing body.

15. The method according to claim 12, further comprising making, a second sleeve of the at least one sleeve on the inner-joint-portion side bellows contact area of the inner joint portion, at a same time as the at least one sleeve that is located on the bearing-body-side bellows contact area.

16. A joint comprising:
   a housing defining an axis and having axially opposite journal openings,
   an inner joint portion having an outer surface with a bearing area and first and second neck areas, the bearing area is arranged within the housing, and the first and second neck areas extend axially out of the housing through a respective one of the journal openings,
   a bearing body having an inner surface, the bearing body being arranged within the housing such that the bearing body mates with the housing and the inner surface mates with the bearing area of the outer surface of the inner joint portion, the bearing body extending axially through the journal openings and beyond an entire axial length of the housing, the bearing body enclosing the bearing area of the inner joint portion and comprising plastic, the bearing body being materially uniform in a radial direction from the inner surface to the housing and along the entire axial length of the housing,
   the bearing area of the outer surface of the inner joint portion being secured within the bearing body on the inner surface such that the inner joint portion is axially fixed and at least one of rotatable and pivotable relative to the bearing body and the housing,
   first and second sealing bellows extending axially and surrounding the first and the second neck areas of the inner joint portion, respectively, each of the first and the second sealing bellows having first and second axial ends, the first axial ends of the first and the second sealing bellows mating with a respective contact area of the bearing body while the second axial end of the first sealing bellows mates with a contact area of the first neck area, and the second axial end of the second sealing bellows mates with a contact area of the second neck area, and
   each of the first axial ends of each of the first and the second sealing bellows directly contacting a respective first sleeve, and each of the second axial ends of each of the first and the second sealing bellows directly contacting a respective second sleeve, the second sleeves extend axially and surround the inner joint portion and mate with the contact area of the respective one of the first and the second neck areas, the first sleeves extend axially and surround the inner joint portion and mate with the respective contact area of the bearing body, the first and the second sleeves comprising plastic, and the first sleeves at the first axial ends of the first and the second sealing bellows surrounding the first axial ends of the sealing bellows and the second sleeves at the second axial ends of the first and the second sealing bellows being surrounded by the second axial ends of the respective first and the second sealing bellows, and
   the first and the second sleeves having a radial limb at an axial end thereof, and the first and the second axial ends of the respective first and the second sealing bellows being respectively axially fixed by the respective radial limbs of the respective first and the second sleeves, the first axial ends of the first and the second sealing bellows are received by the respective contact area of the bearing body from a radial interior of the bearing body.

\* \* \* \* \*